United States Patent [19]

Parr

[11] Patent Number: 4,932,369
[45] Date of Patent: Jun. 12, 1990

[54] INTERNAL COMBUSTION ENGINE INLET MANIFOLD

[75] Inventor: T. Graham Parr, Finham Coventry, United Kingdom

[73] Assignee: Austin Rover Group Limited, England

[21] Appl. No.: 385,059

[22] Filed: Jul. 26, 1989

[30] Foreign Application Priority Data

Aug. 16, 1988 [GB] United Kingdom ............... 8819431

[51] Int. Cl.⁵ ............................................. F02M 35/00
[52] U.S. Cl. ........................ 123/52 MB; 123/59 AL; 123/120 A
[58] Field of Search ......... 123/52 M, 52 MB, 59 AL, 123/190 A, 52 MC

[56] References Cited

U.S. PATENT DOCUMENTS

| | | | |
|---|---|---|---|
| 2,835,235 | 5/1958 | Gassmann | 123/52 M |
| 4,259,980 | 4/1981 | Muller | 137/375 |
| 4,506,636 | 3/1985 | Negre et al. | 123/190 A |
| 4,619,226 | 10/1986 | Ueda et al. | 123/52 MC |
| 4,622,931 | 11/1986 | Wickramasuriya | 123/190 A |
| 4,664,076 | 5/1987 | Miyano et al. | 123/52 MB |
| 4,726,329 | 2/1988 | Aktin | 123/52 MV |
| 4,727,829 | 3/1988 | Kondo et al. | 123/52 MB |

Primary Examiner—David A. Okonsky
Attorney, Agent, or Firm—Davis, Bujold & Streck

[57] ABSTRACT

An internal combustion engine inlet manifold is disclosed which comprises of a housing defining a plenum, at least one inlet tract and at least one rotary valve member supported by the housing. The or each inlet tract has first and second lengths one of which extends away from the plenum for connection to an engine to which the inlet manifold is to be connected. The or each valve member is arranged to be rotatable from a first position in which the first and second lengths are connected in series between the plenum and the engine via the or each valve member and a second position in which connection is made between the plenum and the engine solely by means of the first length of the or each inlet tract via the or each valve member.

17 Claims, 6 Drawing Sheets

INTERNAL COMBUSTION ENGINE INLET MANIFOLD

This invention relates to internal combustion engines and in particular to an inlet manifold for an internal combustion engine in which the inlet tract length is switchable between at least two lengths.

In order to improve the performance of an internal combustion engine it is desirable to reduce the length of the inlet tract as the rotational speed of the engine is increased.

It is known to provide for example from GB No. 2174454 a cast aluminium inlet manifold having a single plenum a first length of inlet passage extending from the plenum for connection to an engine to which the inlet manifold is to be connected, a second length of inlet passage extending from the plenum to a valve, the valve being operable to either connect the first and second lengths of inlet passage in series or to connect the first inlet passage directly to the plenum.

It is an object of this invention to provide an internal combustion engine having an improved inlet manifold.

According to the invention there is provided an internal combustion engine inlet manifold comprising a housing defining a plenum and at least one inlet tract having first and second lengths, one of said first and second lengths extending away from the plenum for connection to an engine to which the inlet manifold is connected in use and at least one rotary valve member supported by the housing, the arrangement being such that the or each valve member is rotatable from a first position in which the first and second lengths are connected in series between the plenum and the engine via the or each valve member and a second position in which connection is made between the plenum and the engine solely by means of the first length of the or each inlet tract via the or each valve member.

Preferably, the housing is formed as two halves secured together therebeing a first half and a second half.

Preferably, the or each rotary valve member is located in a valve chamber defined by at least one of said first and second halves.

Preferably, each first length extends from a respective valve chamber for connection to said engine and each second length extends from the respective valve chamber to the plenum.

Advantageously, the plenum is connected to the or each valve chamber by a respective bellmouth shaped inlet and to the second length via a bellmouth shaped entry portion.

This has the advantage that a smooth air flow between the plenum and the valve chamber or the second length is produced thereby increasing the efficiency of the inlet manifold.

Advantageously, at least part of the or each second length is formed by a fabricated tube.

This has the advantage that the length of the second length can be altered without the need for a new housing.

Preferably, the second half is made of a plastics material.

This has the advantage of low weight combined with good vibration absorption.

Advantageously, the rotary valve member is made of a plastics material. This has the advantage of low weight and if the same material is used as for the lower part the effects of differential thermal expansion are minimised.

Advantageously, each inlet tract has an independent valve member associated with.

This has the advantage that switching from the first position to the second position or vice-versa can be effected at the most efficient point in time.

The invention will now be described by way of example with reference to the accompanying drawing of which:

Figure 1:
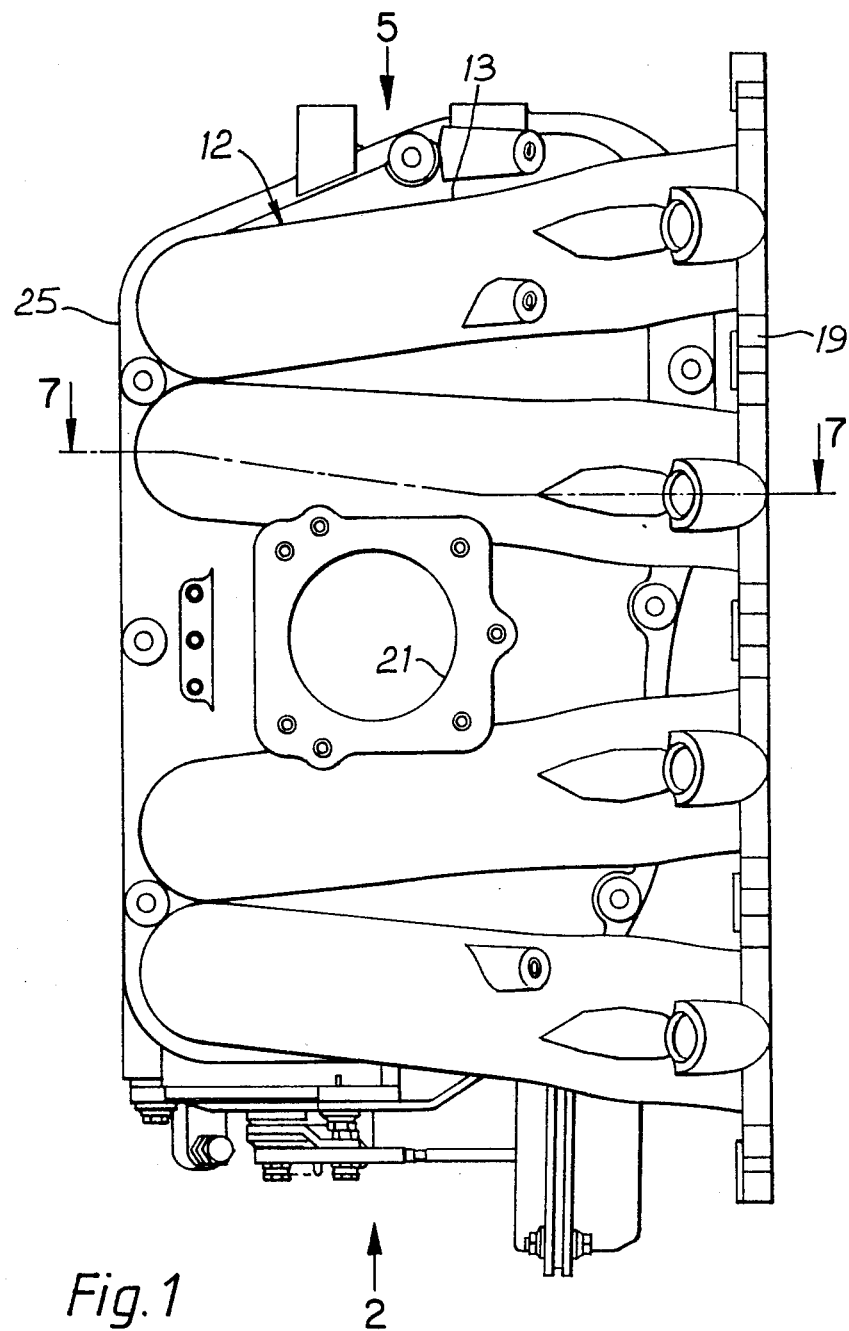
FIG. 1 is a plan view of an internal combustion engine inlet manifold according to the invention.
Figure 2:
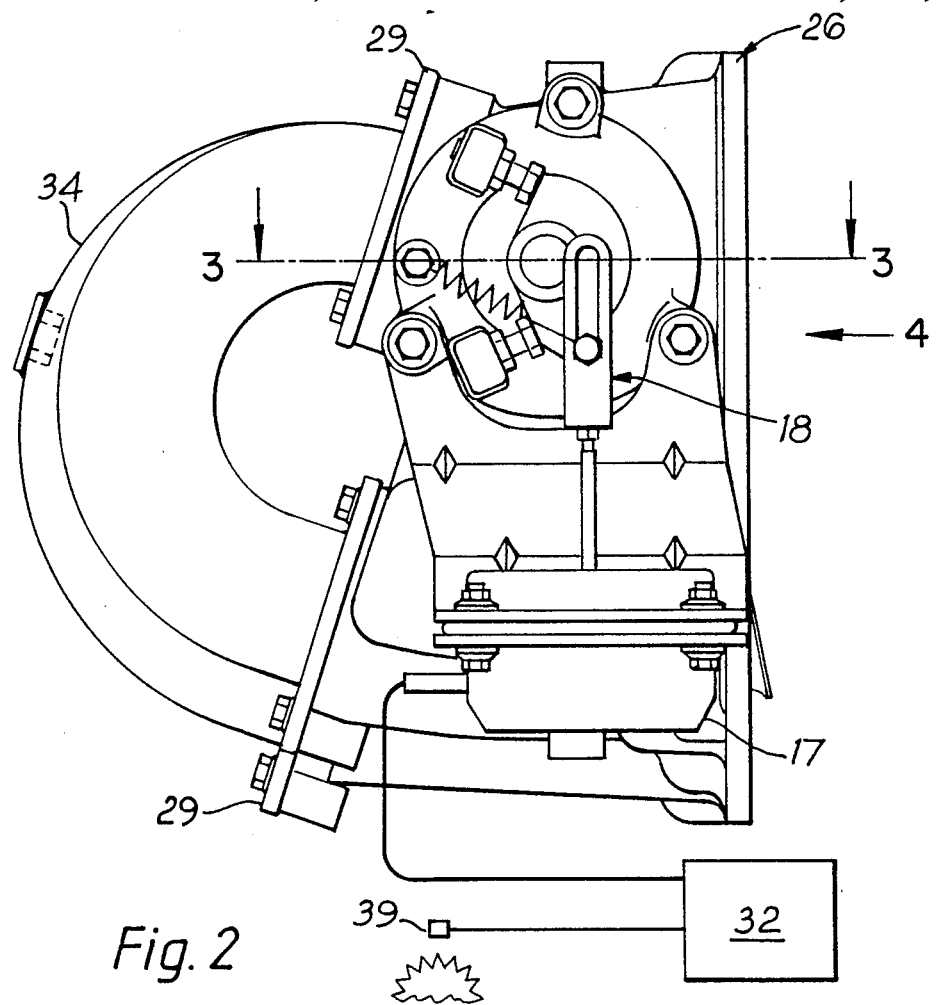
FIG. 2 is a view in the direction of arrow 'E' on FIG. 1 but showing only a lower half of the inlet manifold.
Figure 3:
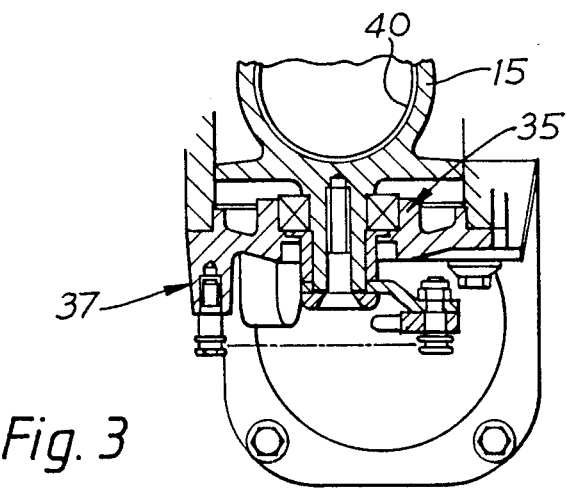
FIG. 3 is a part section along the line A—A on FIG. 2.
Figure 4:
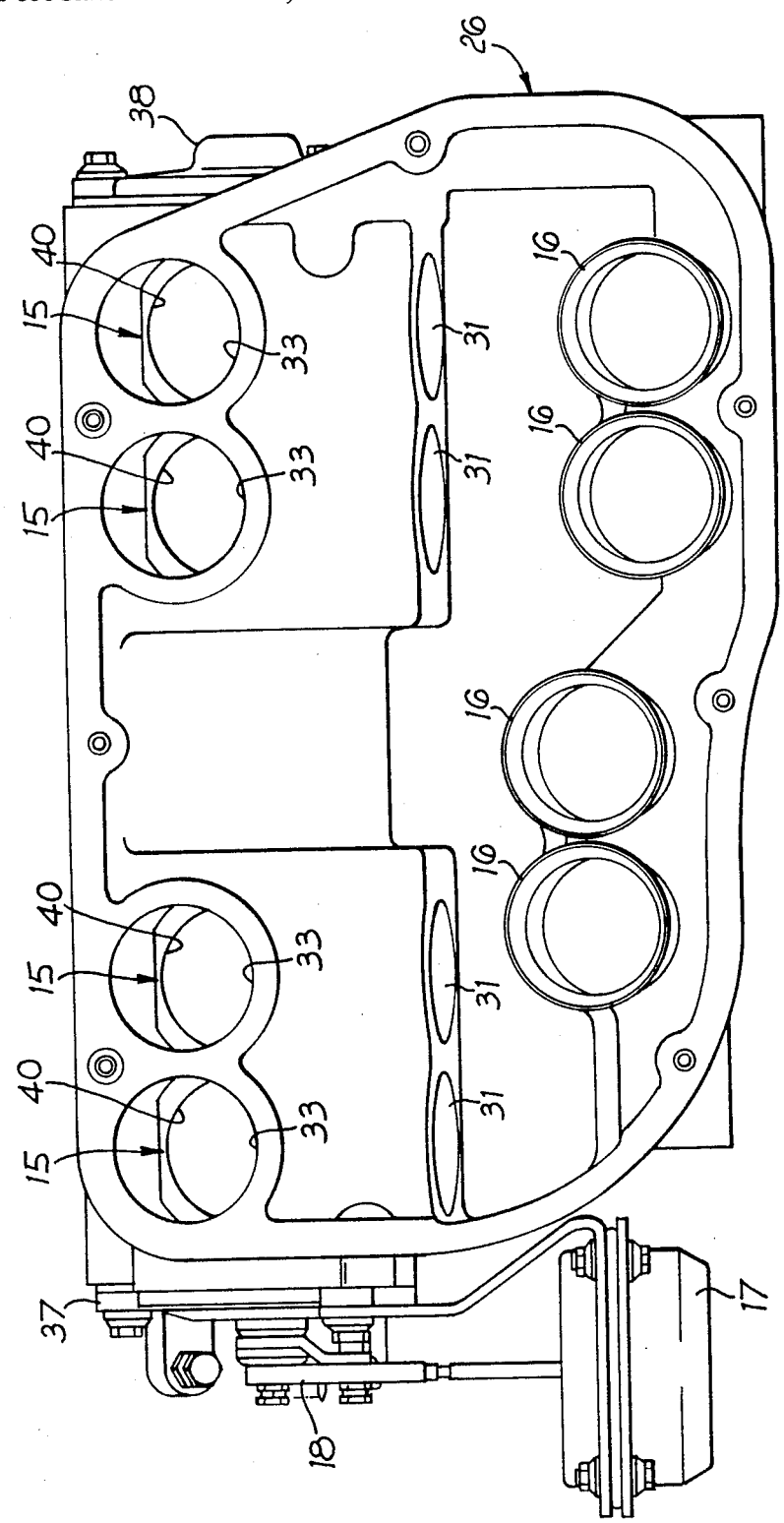
FIG. 4 is a view in the direction of arrow 'T' on FIG. 2.
Figure 5:
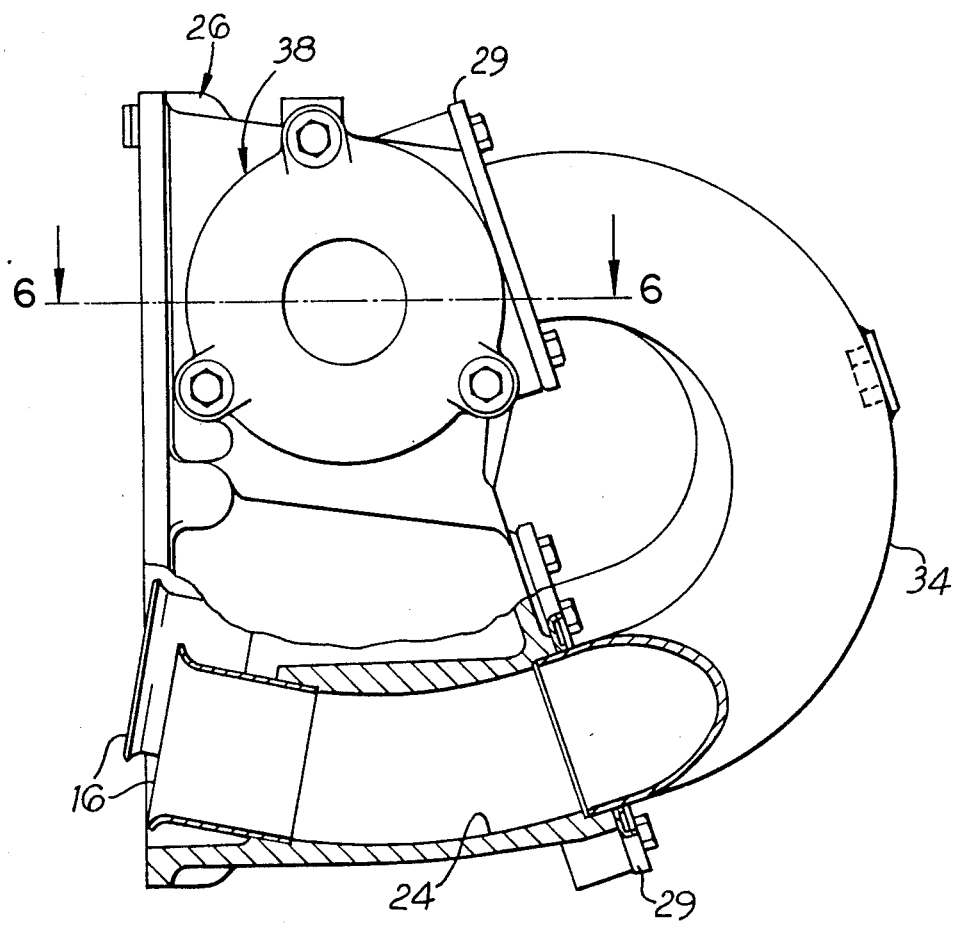
FIG. 5 is a view in th direction of arrow 'S' on FIG. 1 but showing only the lower half of the inlet manifold.
Figure 6:
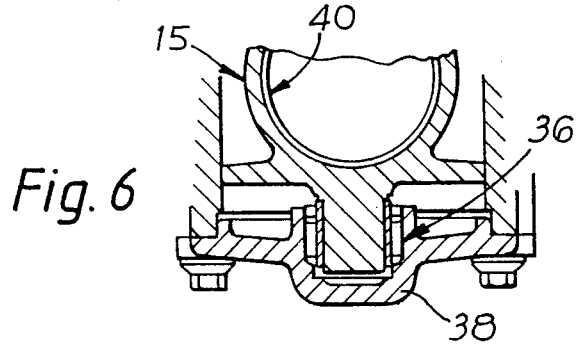
FIG. 6 is a cross section along the line B—B on FIG. 5.

With reference to the figures there is shown an internal combustion engine inlet manifold having a plenum 11 and a number of inlet tracts 12.

The plenum 11 is defined by a two part housing therebeing an first half 25 cast from aluminium alloy and a second half 26 moulded from plastics material the two halves being secured together to form the plenum 11.

Each of the inlet tracts 12 is in two lengths, therebeing a first length 13 extending from the plenum 11 for connection by means of a flange 19 to a respective inlet port of an engine 50 and a second length 14 connected at both ends to the plenum 11.

Each of the first lengths 13 is defined by a passageway 23 cast into the first half 25 and by a further passageway 33 moulded into the second half 26.

Each of the second lengths 14 is defined by a passageway 24 moulded into the second half 26, a fabricated bellmouth 16 and by a fabricated tube 34.

Each of the bellmouths 16 is push fitted into one end of a respective passageway 24 to connect that passageway with the plenum 11.

Each of the fabricated tubes 34 extends externally of the plenum 11 and is connected to the second half 26 at both ends by respective couplings 29.

A number of valve chambers 30 are moulded as an integral part of the second half 26. Each of the valve chambers 30 has a valve element of a valve member 15 located in it.

Each of the valve chambers 30 is connected to a respective passageway 23 and tube 34 and to the plenum 11.

Each of the valve chambers 30 is connected to the plenum 11 via a respective bellmouth shaped inlet 31.

The rotary valve member 15 is rotatably mounted at both end portions by means of bearings 35,36 located in end caps 37,38 and is rotatable from a first position in which it connects the first and second lengths 13 and 14 together to a second position in which it connects the first length 13 to the inlet 31 by an actuator in the form of a solenoid 17 and associated linkage 18.

The solenoid 17 is energised by a control unit 32 when the engine speed exceeds a pre-determined speed to move the rotary valve 15 into said second position or to move the rotary valve 15 into said first position if the engine speed drops below the pre-determined speed.

An engine speed signal is supplied to the control unit 32 from a speed sensor 39 for comparison with a pre-determined value to check whether the speed is above or below said predetermined speed.

The rotary valve member 15 is moulded from the same plastics material as the lower half 26 and has a number of transverse ducts 40 formed in it at positions corresponding to the locations of the inlets 31 to provide the connection between said first and second lengths 13,14 and said inlets 31 in said first and second positions.

Figure 7:
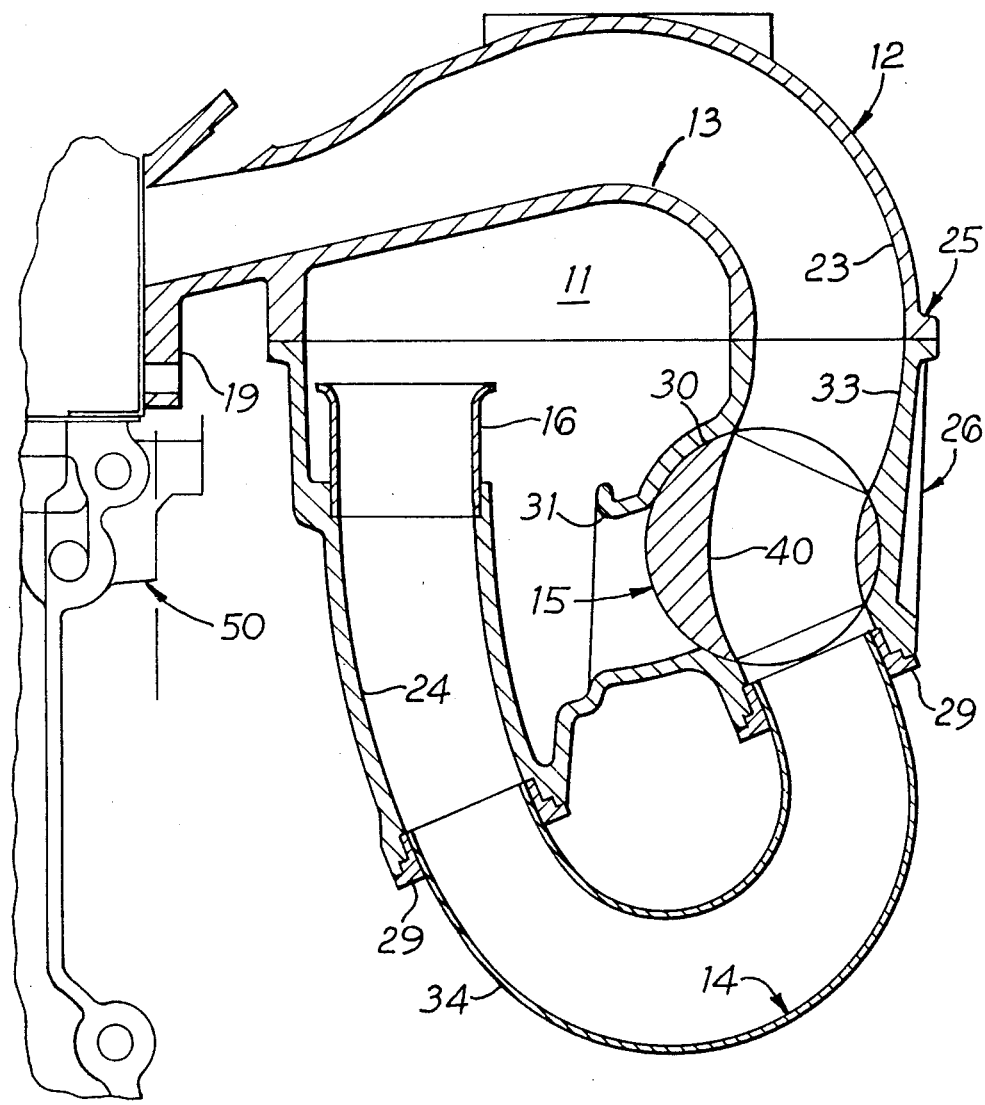
FIG. 7 is a cross section along the line C—C on FIG. 1 showing a rotary valve member of the inlet manifold in a first position.

Operation of the inlet manifold is as follows; when the engine speed is below a predetermined average rotational speed as sensed by the speed sensor 39 the rotary valve member 15 is in said first position as shown in FIG. 7.

In this first position the first and second lengths 13 and 14 are connected together to form one long inlet tract.

As air is drawn into the plenum 11 via an aperture 21 in the upper half 25 it enters the or each second length 14 via the respective bellmouth 16 and travels along the respective passageway 24 and tube 34 defining that second length 14 to the rotary valve member 15. The air is then transferred via the cooperating duct 40 into the corresponding passageways 23, 33 to the respective inlet port of the engine 50.

Figure 8:
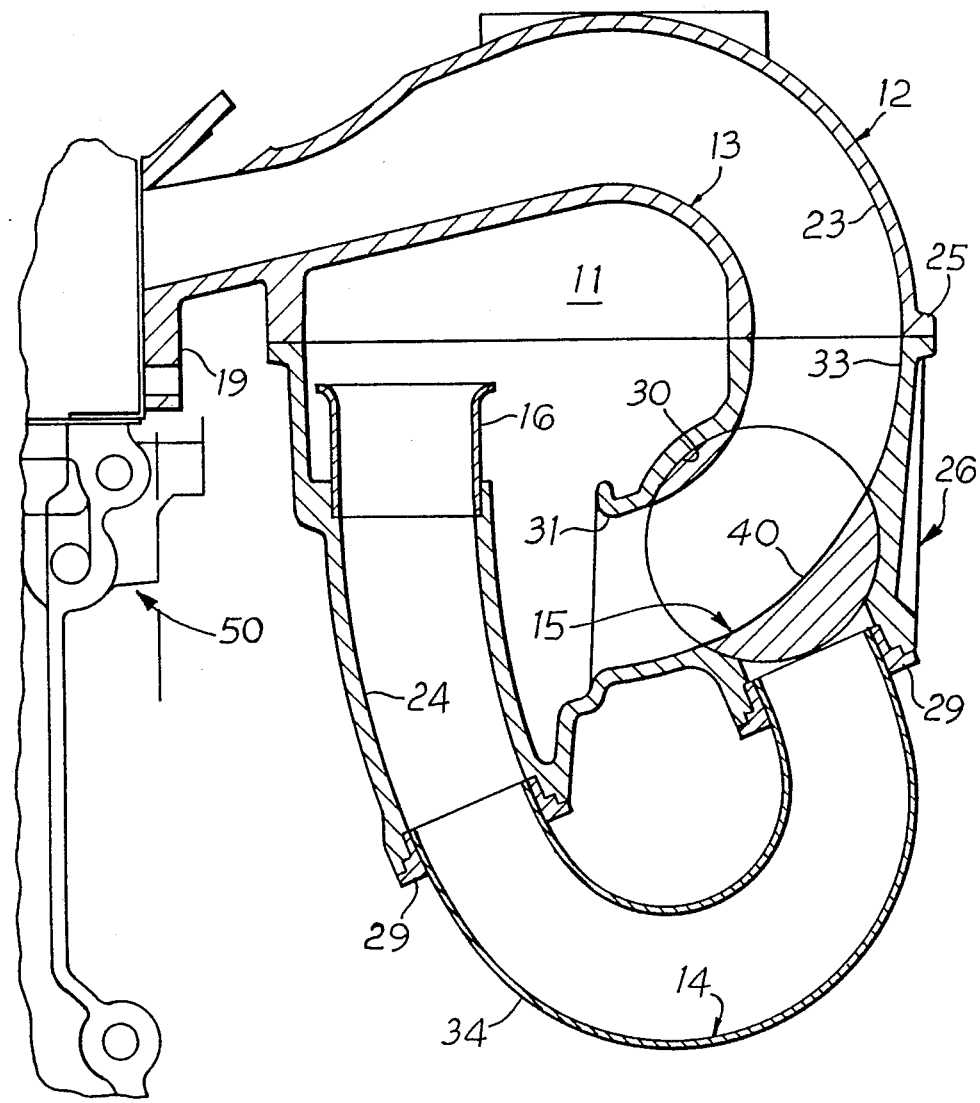
FIG. 8 is a cross section similar to FIG. 7 but showing the rotary valve member in a second position.

When the engine speed as measured by the speed sensor 39 exceeds said predetermined rotational speed the solenoid 17 is energised by the control unit 32 causing the rotary valve member 15 to be rotated to said second position as shown in FIG. 8 thereby disconnecting the first and second lengths 13 and 14.

In this second position air enters the plenum 11 via the aperture 21 and passes through the inlets 31 directly into the ducts 40 of the rotary valve member 15. The air flows through the ducts 40 and into the passageways 23, 33 to the respective inlet port of the engine 50.

When the engine speed as measured by the speed sensor 39 falls below said predetermined rotational speed the solenoid 17 is energised by the control unit 32 causing the rotary valve member 15 to be rotated back to said first position thereby re-connecting the first and second lengths 13 and 14.

The length of the inlet tract 12 is therefore switchable between a long length utilising the first and second lengths 13 and 14 connected in series to produce good torque at low engine speeds and a short length utilising the first length 13 only to produce improved power at higher engine speeds.

In either case a smooth entry to the or each inlet tract is ensured by providing a bellmouth shaped entry portion in the form of the bellmouth 16 and inlet 31.

Although this invention has been described with respect to a specific embodiment in which the valve member is of unitary construction having a number of separate ducts moveable in unison it is not limited to such a construction. Each of the inlet tracts may have a separate valve member moveable independently of the others so that switching can occur at the most efficient point in time. For example the switching could occur at the first time a piston of the engine associated with that inlet tract enters a compression stroke after the pre-determined speed has been exceeded.

Similarly, other forms of actuator could be used to replace the solenoid described herein.

I claim:

1. An internal combustion engine inlet manifold comprising:
   a housing defining a plenum, at least one valve chamber, inlet means to connect each of said valve chambers directly to the plenum and at least one inlet tract;
   the or each inlet tract having a first length extending from a respective one of said valve chambers for connection to an engine to which the inlet manifold is connected in use and a second length extending from the respective valve chamber to the plenum;
   a like number of plastic rotary valve members as there are inlet tracts, each valve member having a transverse duct defined therein and being rotatably supported by the housing within a respective valve chamber,
   the arrangement being such that the length of each inlet tract is changeable by rotation of the or each valve member from a first position in which the first and second lengths are connected in series between the plenum and the engine via the respective transverse duct of the valve member associated therewith to a second position in which each of the first lengths is connected via a respective inlet means to the plenum via the respective transverse duct of the valve member associated therewith.

2. An internal combustion engine inlet manifold as claimed in claim 1 in which the housing is formed in two halves secured together therebeing a first half and a second half.

3. An internal combustion engine inlet manifold as claimed in claim 1 in which there is one rotary valve member having the same number of transverse ducts formed in it as there are inlet tracts.

4. An internal combustion engine inlet manifold as claimed in claim 1 in which each inlet tract has an independent rotary valve member associated with it.

5. An internal combustion engine inlet manifold as claimed in claim 1 in which the or each valve member is moveable from said second position to said first position by an actuator when the engine speed falls below a pre-determined speed.

6. An internal combustion engine inlet manifold as claimed in claim 1 in which the or each valve member is moveable from said first position to said second position by an actuator when a pre-determined engine speed has been reached.

7. An internal combustion engine inlet manifold as claimed in claim 6 in which the or each valve member is moveable from said second position to said first position by an actuator when the engine speed falls below a pre-determined speed.

8. An internal combustion engine inlet manifold as claimed in claim 2 in which each valve chamber is defined by said second half.

9. An internal combustion engine inlet manifold as claimed in claim 2 in which the second half is made of a plastics material.

10. An internal combustion engine inlet manifold as claimed in claim 2 in which at least part of the or each first length is formed by a passageway in the first half.

11. An internal combustion engine inlet manifold as claimed in claim 2 in which at least part of the or each second length is formed by a passageway in the second half.

12. An internal combustion engine inlet manifold as claimed in claim 2 in which at least part of the or each second length is formed by a fabricated tube.

13. An internal combustion engine inlet manifold as claimed in claim 2 in which the first half is cast from an aluminium alloy.

14. An internal combustion engine inlet manifold as claimed in claim 9 in which the or each rotary valve member is made from the same plastics material as that used for the second half.

15. An internal combustion engine inlet manifold as claimed in claim 8 in which each inlet means a bellmouth shaped inlet means.

16. An internal combustion engine inlet manifold as claimed in claim 8 in which each second length is connected to the plenum via a bellmouth entry portion.

17. An internal combustion engine inlet manifold as claimed in claim 15 in which each second length is connected to the plenum via a bellmouth entry portion.

* * * * *